(12) United States Patent
Balk

(10) Patent No.: US 10,099,861 B2
(45) Date of Patent: Oct. 16, 2018

(54) HELICAL CONVEYOR

(71) Applicant: AMBAFLEX INTERNATIONAL B.V., Zwaag (NL)

(72) Inventor: Wouter Balk, Baambrugge (NL)

(73) Assignee: AMBAFLEX INTERNATIONAL B.V., Zwaag (NL)

( * ) Notice: Subject to any disclaimer, the term of this patent is extended or adjusted under 35 U.S.C. 154(b) by 0 days.

(21) Appl. No.: 15/538,590

(22) PCT Filed: Dec. 24, 2015

(86) PCT No.: PCT/NL2015/050908
§ 371 (c)(1),
(2) Date: Jun. 21, 2017

(87) PCT Pub. No.: WO2016/105201
PCT Pub. Date: Jun. 30, 2016

(65) Prior Publication Data
US 2017/0369252 A1 Dec. 28, 2017

(30) Foreign Application Priority Data
Dec. 24, 2014 (NL) ...................................... 2014054

(51) Int. Cl.
*B65G 21/18* (2006.01)
*B65G 17/08* (2006.01)

(52) U.S. Cl.
CPC ............. *B65G 21/18* (2013.01); *B65G 17/08* (2013.01)

(58) Field of Classification Search
CPC ..................................................... B65G 21/18
(Continued)

(56) References Cited

U.S. PATENT DOCUMENTS 1,575,194 A * 3/1926 Dewey .................... F26B 15/26
198/778
3,842,968 A 10/1974 Owens
(Continued)

FOREIGN PATENT DOCUMENTS

EP 1902978 3/2008
JP H08104411 4/1996

OTHER PUBLICATIONS

International Search Report and Written Opinion for International patent application No. PCT/NL2015/050908, dated Aug. 17, 2016.

*Primary Examiner* — James R Bidwell
(74) *Attorney, Agent, or Firm* — Steven M. Koehler; Westman, Champlin & Koehler, P.A.

(57) ABSTRACT

A conveyor comprises a helical conveying path having an upright central axis, a frame and an endless conveying member for transporting a product through the conveying path which conveying member is displaceable with respect to the frame. In a central portion of the conveying path, as seen in radial direction from the central axis, the conveying member is provided with an upwardly directed supporting surface for supporting a product. The width of the supporting surface in radial direction from the central axis is smaller than 10% of the distance between the central axis and the supporting surface. At opposite sides of the supporting surface the conveying path is free from obstacles at the height level of the supporting surface. The conveyor is provided with a helical guide for guiding the conveying member along the guide.

18 Claims, 7 Drawing Sheets

(58) Field of Classification Search
USPC .......................................................... 198/778
See application file for complete search history.

(56) References Cited

U.S. PATENT DOCUMENTS

| | | | |
|---|---|---|---|
| 3,848,732 A | 11/1974 | Catalano | |
| 3,857,476 A * | 12/1974 | Heifetz | B65G 17/066 |
| | | | 198/778 |
| 3,874,497 A * | 4/1975 | Carlson | B65G 21/2072 |
| | | | 198/836.3 |
| 4,627,529 A * | 12/1986 | Tarlton | B65G 21/18 |
| | | | 198/500 |
| 4,738,352 A | 4/1988 | Norbut | |
| 4,953,691 A | 9/1990 | Janzen | |
| 6,336,551 B1 | 1/2002 | Balk | |
| 9,409,715 B2 * | 8/2016 | Balk | B65G 21/18 |
| 2010/0089724 A1 | 4/2010 | Broers et al. | |

* cited by examiner

HELICAL CONVEYOR

CROSS-REFERENCE TO RELATED APPLICATION

The present application is a national stage filing of International patent application Serial No. PCT/NL2015/050908, filed, Dec. 24, 2015 and published as WO 2016/105201 A1 in English.

BACKGROUND

The discussion below is merely provided for general background information and is not intended to be used as an aid in determining the scope of the claimed subject matter.

The present disclosure relates to a conveyor, comprising a helical conveying path having an upright central axis, a frame and an endless conveying member for transporting a product through the conveying path which conveying member is displaceable with respect to the frame, wherein in a central portion of the conveying path as seen in radial direction from the central axis the conveying member is provided with an upwardly directed supporting surface for supporting a product.

Known conveyors are provided with a slat belt as an endless conveying member, which can transport products in vertical direction. In case of transporting weak, block-shaped products, these will be twisted somewhat during travelling through the helical conveying path. For transporting relatively long, wide and rigid, block-shaped products the conveyor will preferably be provided with a conveying path including a relatively large radius and/or a small inclination, since this type of products tends to rest on the slat belt through only two corners located opposite to each other in diagonal direction of the product; more specifically: the highest corner at the inner bend and the lowest corner at the outer bend of the helical conveying path. The inclination in the inner bend is steeper than the inclination in the outer bend. In practice, a product will seek a third supporting location, such that it may wobble or even turn over. Another disadvantage is that at the corners of the product relatively high forces may locally act on the conveying member.

SUMMARY

A conveyor has a width of the supporting surface in a radial direction from the central axis that is smaller than 10% of the distance between the central axis and the supporting surface and in that at opposite sides of the supporting surface the conveying path is free from obstacles at the height level of the supporting surface, wherein the conveyor is provided with a helical guide for guiding the conveying member along said guide. Furthermore, a narrow supporting surface provides the possibility of a relatively low-cost conveying member, while experiments have shown that a narrower supporting surface leads to improved grip between the conveying member and the products that must be transported. Since at opposite sides of the narrow supporting surface the conveying path at the height level of the supporting surface is free from obstacles, the supporting surface forms the highest point of the conveying member, such that a product having a flat bottom and being supported by the supporting surface and extending beyond the conveying member in lateral direction only contacts the mentioned supporting surface. Under operating conditions a product having a flat bottom is only supported by the supporting surface in the central portion of the conveying path.

The width of the supporting surface can possibly be smaller than 5% and preferably be smaller than 2% of the distance between the central axis and the supporting surface.

Preferably, the conveying member is adapted such that the supporting surface is substantially infinitely narrow as seen in cross section. In practice, infinitely narrow does not occur, but it means that when a block-shaped product having a substantially rigid bottom is supported by the conveying member, there is a series of at least three point contacts lying on a curved line or a line contact between the bottom and the supporting surface.

For example, the supporting surface is narrower than 10% of the width of the conveying path and preferably narrower than 5% and more preferably smaller than 2% of the width of the conveying path. It is possible that at the height level of the supporting surface there is an obstacle, but in that case, it does not form a part of the conveying path. Such obstacles can be formed by vertical side walls at the inner bend or outer bend of the conveying path, for example. The width of the conveying path is defined by the distance between the vertical side walls in that case.

An advantage of the conveyor according to the disclosure is that due to the relatively narrow supporting surface the outer sides of relatively wide, block-shaped products project outside the supporting surface and the difference of distance between the respective contact locations of the product and the supporting surface to the central axis becomes relatively small. Reducing this difference of distance will increase the chance of instability of the product on the conveying member. In an ideal case the supporting surface forms an infinitely narrow line, such that a line contact or a series of at least three point contacts between the supporting surface and a flat bottom is approached, which point contacts lie on a curved line.

The supporting surface may be adapted such, that a substantially rigid, flat bottom of a product being supported by the conveying member and being wider than the supporting surface, has at least three contact points with the supporting surface, which contact points lie on a curved line and at a distance from each other.

The supporting surface may be adapted such, that a substantially rigid, flat bottom of a product being supported by the conveying member has at least three contact locations with the supporting surface, which contact locations lie on a curved line. As long as the product to be transported has a center of gravity which lies within the triangle of the at least three contact locations, there is a stable condition.

Preferably, the supporting surface is spherical, as seen in a plane in which the central axis lies, since this allows that the mentioned line contact or a series of at least three point contacts with the supporting surface, which point contacts lie on a curved line, is approached. As seen from above, the supporting surface forms a curved line, possibly a broken line. Contrary to a straight line contact, a curved line contact provides a stable support for a product having a flat bottom.

The conveyor may be provided with a bearing surface for bearing a product which is tilting with respect to the supporting surface, wherein the bearing surface is located at a distance from the supporting surface in radial direction from the central axis. Although a curved line contact may provide a stable support, an unstable situation may still arise due to a leaning mass distribution of a product. The bearing surface stops a product which tends to tilt.

The bearing surface may be directed upwardly and located below the supporting surface, as seen in a plane in which the central axis lies. In that case the bearing surface does not form the obstacle as mentioned above. The bearing surface may be located at opposite sides of the supporting surface and may be formed by two separate portions.

In an alternative embodiment, the bearing surface is located at the inner bend of the conveying path and is directed outwardly with respect to the central axis and/or the bearing surface is located at the outer bend of the conveying path and is directed to the central axis.

The bearing surface may be located above the supporting surface in a plane in which the central axis lies. This is typically suitable for relatively tall products. In this case the bearing surface may be formed by vertical walls at the inner bend and the outer bend of the conveying path.

The bearing surface may form a part of the frame, but it could also be part of the conveying member. In the latter case the bearing surface travels with the product through the conveying path under operating conditions. It is noted that the bearing surface is primarily meant as a safety measure and not as a conventional guide, since the narrow supporting surface itself basically provides a stable support. As described above a product having a substantially flat rigid bottom is supported by at least three points of the supporting surface which lie on a curved line. If the center of gravity lies outside these three points, an unstable situation arises and the bearing surface can stabilize the product.

The upwardly directed supporting surface may be formed by upper sides of projections of the conveying member, wherein the conveying member may comprise a slat belt and each of the slats may be provided with a projection. The projections may be spherical and may be located at the center line of the slat belt.

In an alternative embodiment the conveyor comprises a helical conveying path having an upright central axis, a frame and an endless conveying member for transporting a product through the conveying path which conveying member is displaceable with respect to the frame, wherein the conveying member is provided with an upwardly directed supporting surface for supporting a product, wherein the supporting surface, as seen in radial direction from the central axis, is provided with a central portion and lateral portions which are located at lateral sides of the central portion in radial direction of the central axis, wherein the lateral portions are resiliently connected to the central portion such, that the lateral portions can spring with respect to the central portion by more than 2% of the pitch of the helical conveying member, as seen in a plane in which the central axis lies. Preferably the lateral portions can spring by more than 5% and more preferably by more than 10% of the pitch.

The disclosure is also related to a conveyor comprising a helical conveying path including an upright central axis, a frame and an endless conveying member in the form of a slat belt for transporting a product through the conveying path which conveying member is displaceable with respect to the frame, wherein the conveying member is provided with an upwardly directed supporting surface for supporting a product, wherein the supporting surface is formed by slats and can be twisted about a helical centerline of the slat belt. This is advantageous in a situation when a block-shaped product is placed on the slat belt and is supported by a plurality of slats, the supporting surface can adapt itself to the shape of the bottom of the product such that the product does not rest on the slat belt through only two corners which are located diagonally opposite to each other.

The slats may be tiltable about the helical centerline of the slat belt or bendable in vertical direction with respect to the helical centerline of the slat belt in order to obtain a twistable supporting surface.

It is noted that the word helical indicates that the conveying path in this portion of the conveyor is climbing continuously.

BRIEF DESCRIPTION OF THE DRAWINGS

The disclosure will hereafter be elucidated further with reference to drawings showing embodiments of the disclosure very schematically.

DETAILED DESCRIPTION

Figure 1:
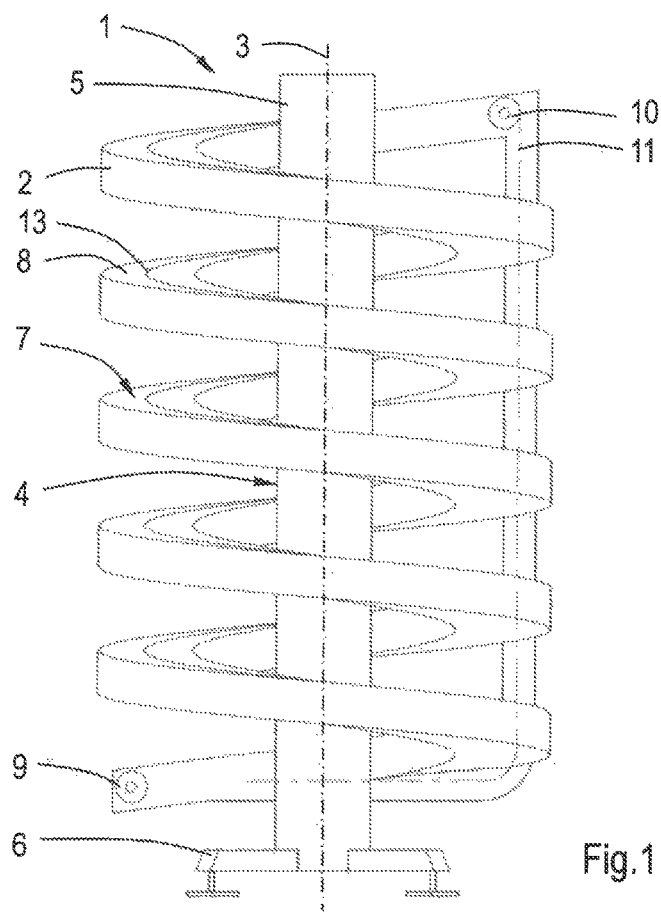
FIG. 1 is a side view of an embodiment of the conveyor according to the disclosure.

FIG. 1 shows an embodiment of a conveyor 1 according to the disclosure. The conveyor 1 has a helical conveying path 2, which runs about an upright central axis 3. Furthermore, the conveyor 1 has a frame 4 which comprises a central column 5, feet 6 and a helical guide trough 7. The feet 6 and the guide trough 7 are mounted to the column 5.

The conveyor 1 is provided with an endless conveying member, in this case a slat belt 8, which is driven by a motor and is guided along the guide trough 7. The slats of the slat belt 8 have a longitudinal direction in transverse direction of the conveying direction of the slat belt 8. The slats are mutually connected through a chain, for example a side-bow chain. The slat belt 8 follows the helical conveying path 2 in vertical direction and is guided back through reverse rollers 9 and 10 at the ends of the helical conveying path 2 via a return section 11 by the shortest path to the helical conveying path 2.

Figure 2:
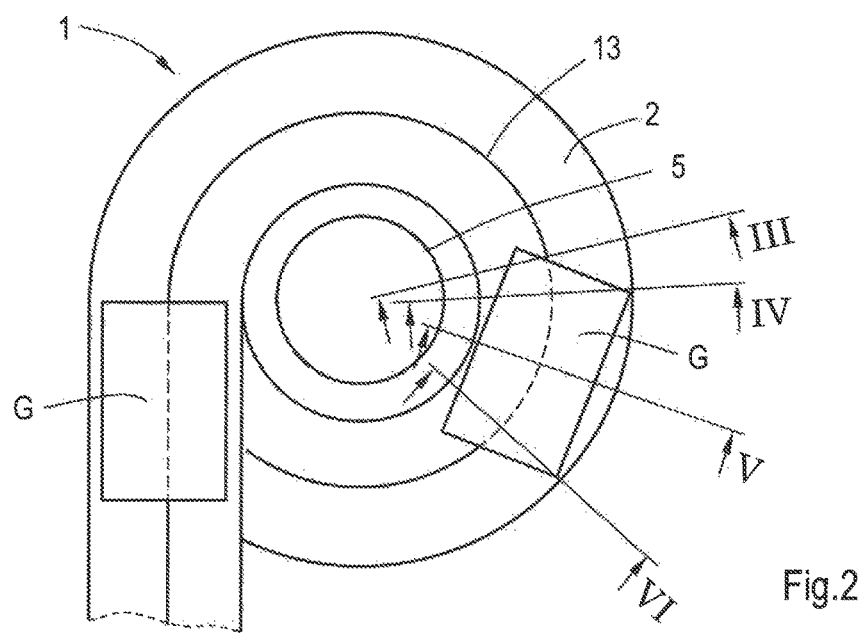
FIG. 2 is a plan view of the embodiment according to FIG. 1, including some products that are transported.

Each of the slats of the slat belt 8 is provided with a spherical projection 12 in its centerline, in this case at the centerline where the chain is located, as well. The upper sides of the projections 12 together form an upwardly directed supporting surface 13 for supporting a product. FIGS. 1 and 2 show that the supporting surface 13 is located in a central portion of the conveying path 2, as seen in a plane in which the central axis 3 lies, or a radial plane with respect to the central axis 3. Products like piece goods G can be placed onto the conveying member 8 and can be supported and conveyed by the supporting surface 13. The supporting surface 13 can also be formed in alternative manners, for example without using the slats.

FIGS. 3-6 show cross-sections of the conveyor 1 according to FIG. 2 at a product G which is on the conveying path 2. The figures show that the width of the supporting surface 13 in a radial direction of the central axis 3 is much smaller than the distance between the central axis 3 and the supporting surface 13, for example smaller than 10% thereof; moreover, the conveying path 2 is free from obstacles at opposite sides of the supporting surface 13 at the height level of the supporting surface 13.

If the supporting surface was formed by flat upper sides of the slats, a block-shaped product having a flat and rigid bottom would basically rest on the slat belt through only two diagonally opposite corners, more specifically the highest corner at the inner bend and the lowest corner at the outer bend of the helical conveying path 2. This is caused by the fact that the inclination at the inner bend is steeper than the inclination at the outer bend. In practice, a product will seek a third supporting location, such that it can wobble or even turn over.

The narrow supporting surface 13 being formed by the spherical projections 12 in the embodiment as shown in FIGS. 1-6 is approached by a line contact between the bottom of the product G and the supporting surface 13 in case of a block-shaped product G having a flat and rigid bottom. Since in this case there is a space between neighboring projections 12 of the slats in the conveying direction, there will be a broken line as seen from above, in fact a series of point contacts on a curved line. If the line contact or the series of point contacts would form a straight line, there would not be a stable supporting capacity, but since there is a line contact with a curved line, an automatic support of at least three points which are not on a single straight line, is created.

Figure 3:
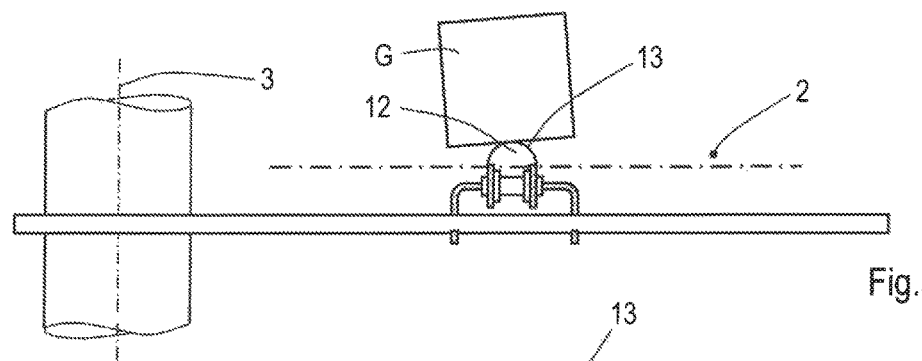
FIGS. 3-6 are cross-sectional views along the respective lines III-III, IV-IV, V-V and VI-VI in FIG. 2.
Figure 4:
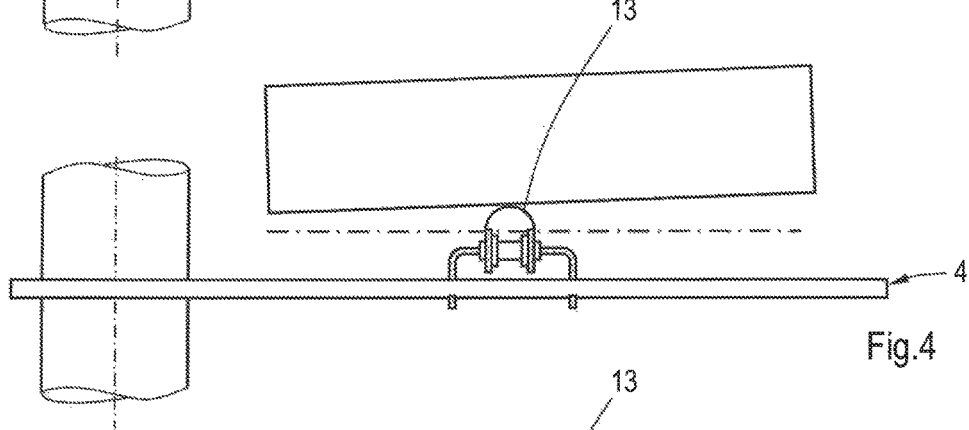
Figure 5:
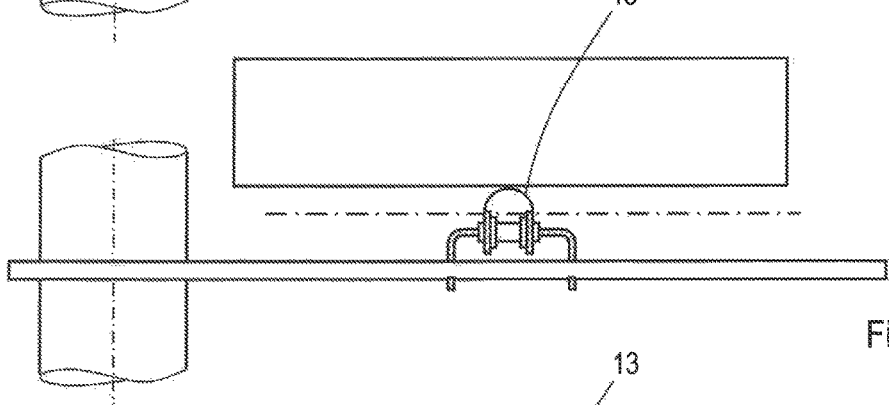
Figure 6:
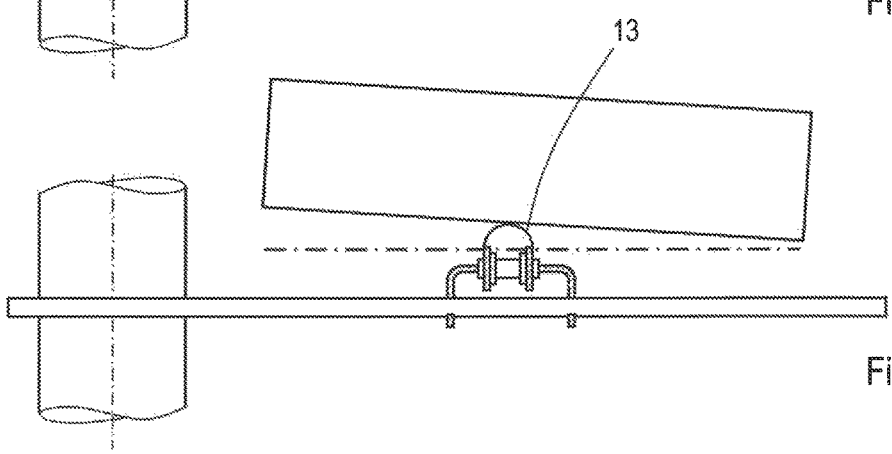
Figure 7:
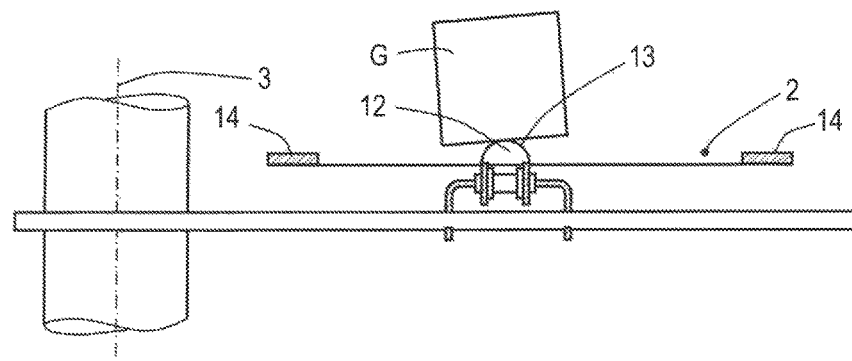
FIGS. 7-10 are cross-sectional views similar to FIGS. 3-6 of an alternative embodiment.
Figure 8:
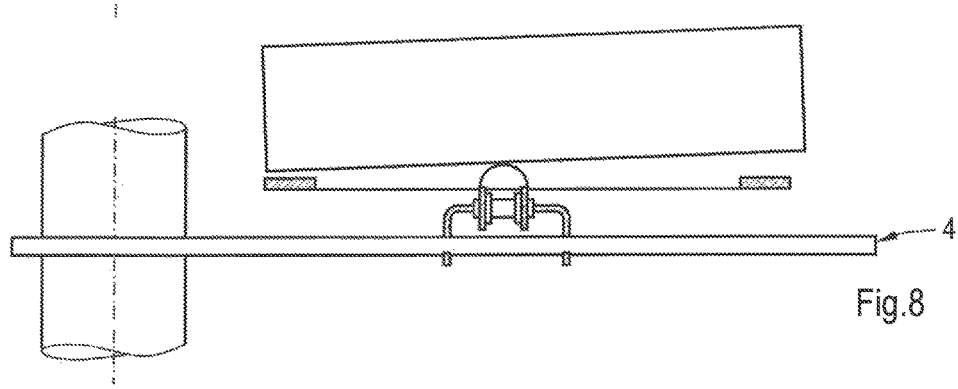
Figure 9:
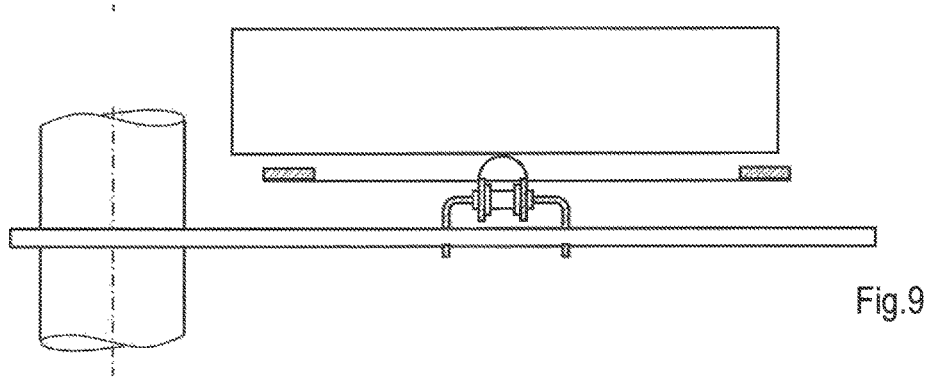
Figure 10:
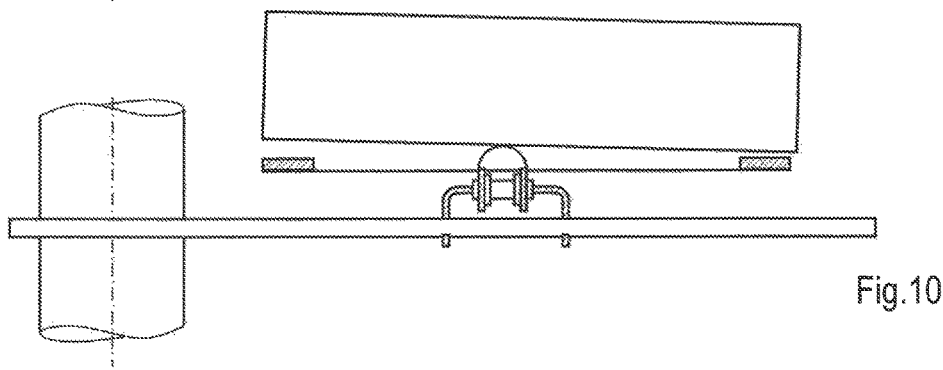
Figure 11:
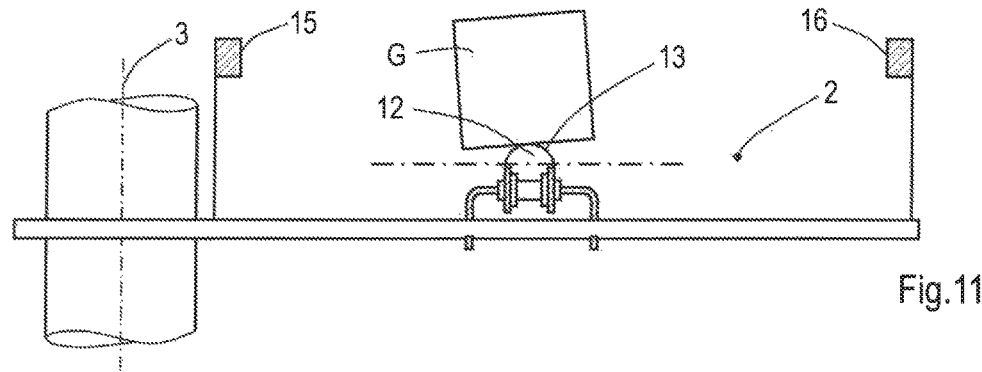
FIGS. 11-14 are cross-sectional views similar to FIGS. 3-6 of another alternative embodiment.
Figure 12:
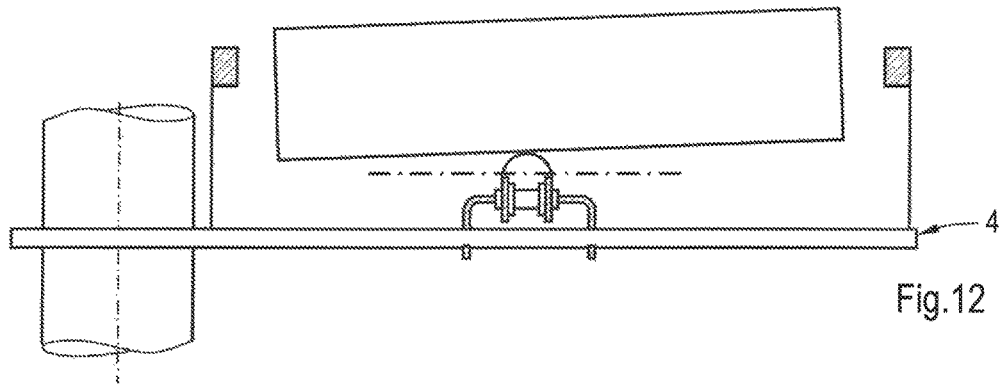
Figure 13:
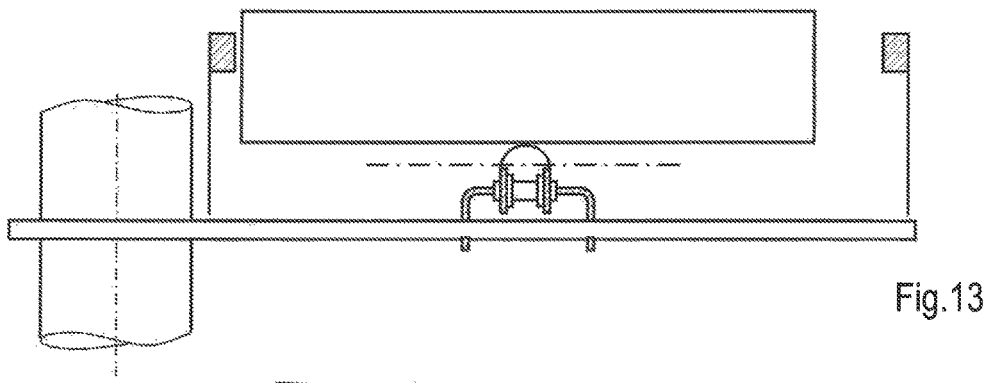
Figure 14:
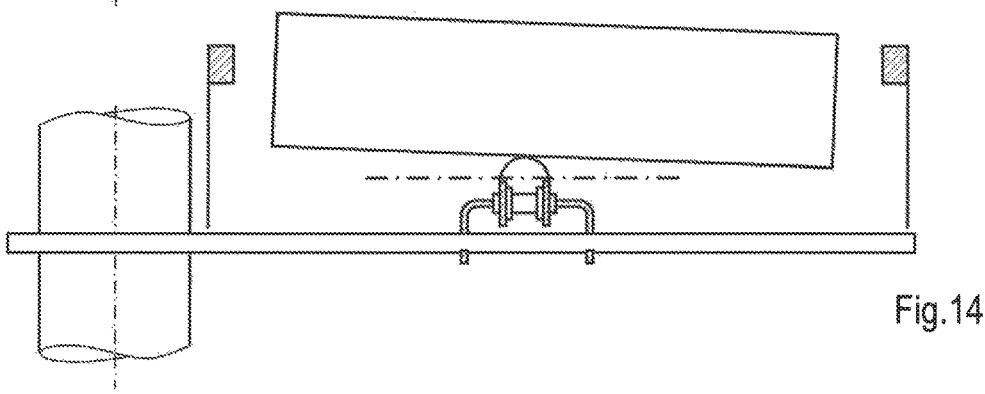

FIG. 5 shows that in the radial plane with respect to the central axis 3 the flat bottom of the product G in the middle of the product G extends nearly horizontally. In the conveying direction, the product G is angled with respect to the horizontal plane which angle almost equals the average inclination of the conveying path 2. The cross-sections in other radial planes, as shown in FIGS. 3, 4 and 6, show that the bottom of the product G have deviating angles with respect to the frame 4 than in the cross-section according to FIG. 5. It is noted, that if cross-sections are drawn of planes which extend parallel to that as shown in FIG. 5, the orientation of the product G would be always the same in the drawings.

FIGS. 3-6 make clear that if the slats in the radial direction with respect to the central axis 3 at a distance from the supporting surface 13 would have an obstacle at the height level of the supporting surface 13, these obstacles would form an extra contact surface outside the approached line contact and the intended effect would be destroyed. Thus, basically in FIGS. 3-6 the slats on which the projections 12 are applied have no function and for that reason they are depicted as dashed lines.

FIGS. 2, 3, 4 and 6 illustrate that the lack of obstacles at opposite sides of the supporting surface 13 means that a block-shaped product which is wider than the supporting surface 13 and even wider than the slat belt 8, and having a length of 10-20% of the length of a single revolution of the helical conveying path, for example, or is supported by for example 5-10 slats, the dimensions of the slat belt 8 are such that the block-shaped product only contacts the supporting surface 13 and not the remainder of the slats outside the supporting surface 13.

Although the approximated curved line contacts can transport block-shaped products having a rigid bottom, in practice there will be a demand to avoid possible tilting of a product with respect to the line contact. This might occur, for example, in case of uneven weight distribution of the product G or placing the product G out of center on the conveying path 2. In order to prevent a product from turning over, an alternative embodiment is provided with bearing surfaces 14, see FIGS. 7-10. In this embodiment, the bearing surfaces 14 are formed by upper sides of small blocks which are provided on the slats. Hence, the bearing surfaces 14 move together with the supporting surface 13. However, it is also conceivable that the bearing surfaces 14 have a fixed position on the frame 4. When the product G tends to tilt, the bearing surfaces 14 will catch the product G.

In the embodiment, according to FIGS. 7-10 the bearing surfaces 14 are directed upwardly and are located below the supporting surface 13, as seen in a plane which extends radially with respect to the central axis 3. In another alternative embodiment, the bearing surfaces 14 are located at the inner bend and outer bend of the conveying path 2. This is shown in FIGS. 11-14, in which the slats are also made narrower in order to illustrate that they do not have a function in this case. The bearing surface at the inner bend of the conveying path 2 is indicated by 15 in the figures and is directed outwardly with respect to the central axis 3. The bearing surface at the outer bend of the conveying path 2 is indicated by 16 in the figures and directed to the central axis 3. The bearing surfaces 15, 16 according to this embodiment will specifically be applied for transporting relatively tall products. The bearing surfaces 15, 16 are located above the supporting surface 13 in this case, as seen in a plane which extends radially with respect to the central axis 3. Although the bearing surfaces 15, 16 are part of the frame 4 in this embodiment, it is also conceivable to lengthen the slats and to provide their ends with upright supports having bearing surfaces 15, 16 thereon.

Figure 15:
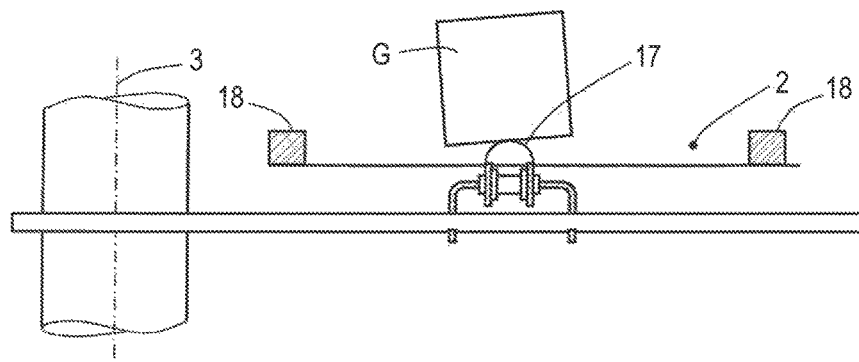
FIGS. 15-18 are cross-sectional views similar to FIGS. 3-6 of still another alternative embodiment.
Figure 16:
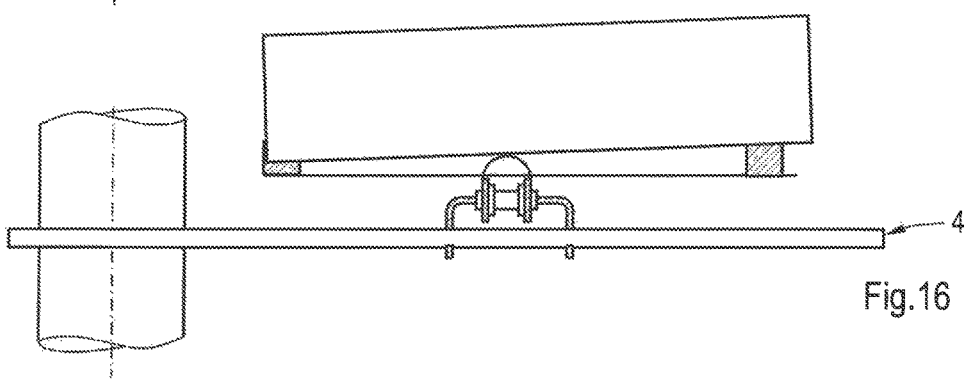
Figure 17:
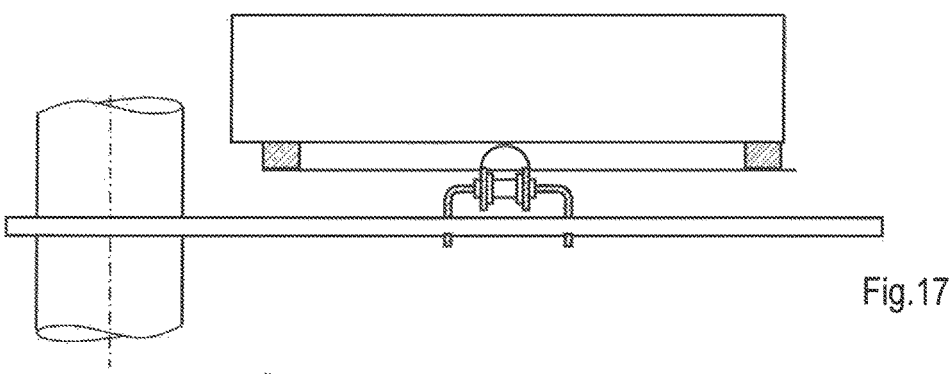
Figure 18:
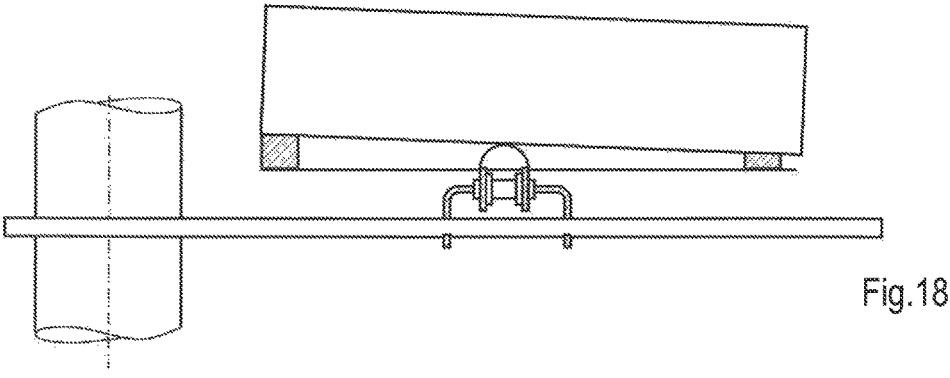
Figure 19:
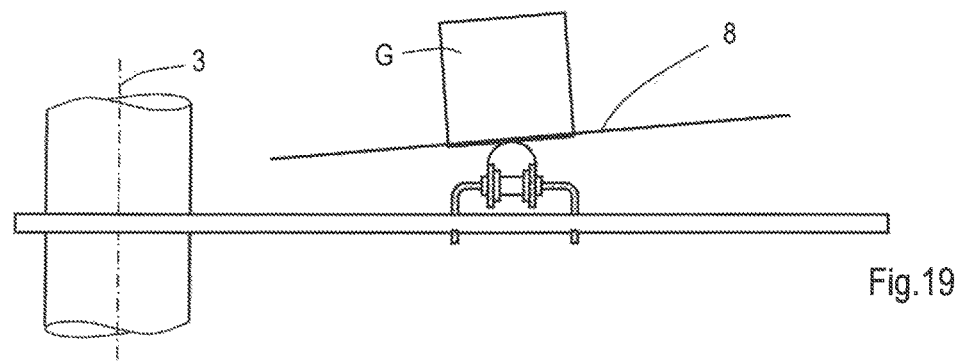
FIGS. 19-22 are cross-sectional views similar to FIGS. 15-18 of still another alternative embodiment.
Figure 20:
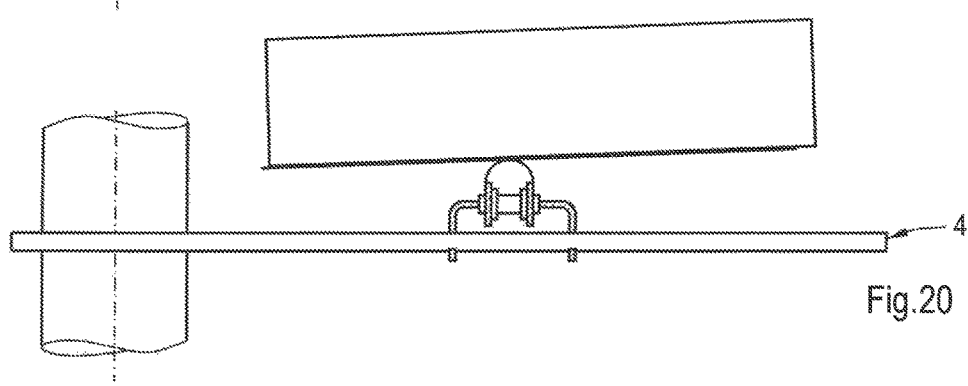
Figure 21:
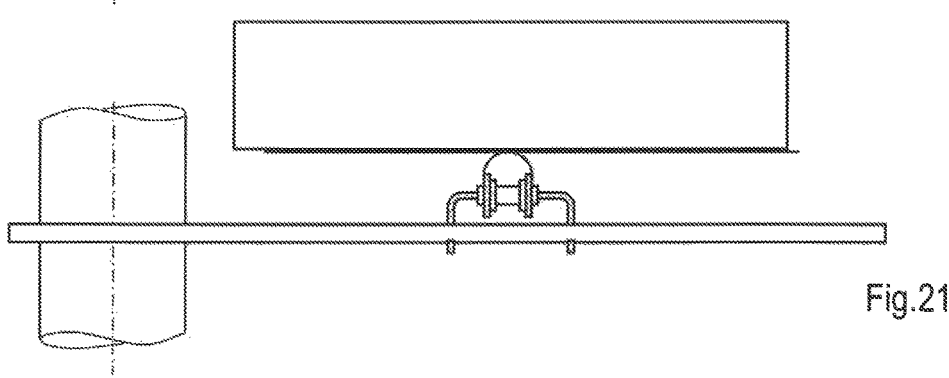
Figure 22:
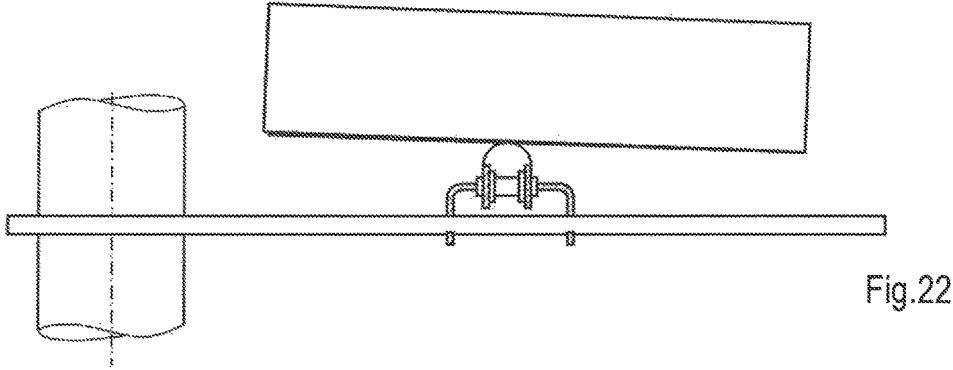

FIGS. 15-18 show another alternative embodiment. In this case the supporting surface is formed by slats each having a central portion 17 and two lateral portions 18. The lateral portions 18 of the supporting surface are located in radial direction with respect to the central axis 3 at opposite sides remote from the central portion 17. The lateral portions 18 are resiliently connected to the central portion 17 via the slats. In rest, as shown in FIG. 15 the lateral portions 18 may lie at a higher level than the central portion 17 as seen in a radial plane through the central axis 3. This means that in case of a rebound the product may also be supported by one of the lateral portions 18, as can be seen at the right side of FIG. 16 and the left side of FIG. 18, for example.

Preferably, the lateral portions 18 may rebound in vertical direction with respect to the central portion 17 by more than 10% of the pitch of the helical conveying path 2 as can be seen in a plane in which the central axis 3 lies.

The lateral portions may be all kinds of spring elements, such as gel-filled spring members.

FIGS. 19-22 show still another alternative embodiment. In this case the slats of the slat belt 8 are tiltable about the helical centerline of the slat belt 8, such that a twistable supporting surface can be obtained. The helical centerline lies close to the chain in the center of the conveying path in this embodiment. Each of the slats has a flat upper side. In the cross-sections as shown in FIGS. 19-22 it can be seen that the slats take a position which corresponds to the bottom of the block-shaped product G. In such a case, neighboring slats have different orientations with respect to the horizontal. Due to the helical conveying path this means that the supporting surface is twisted locally.

Figure 23:
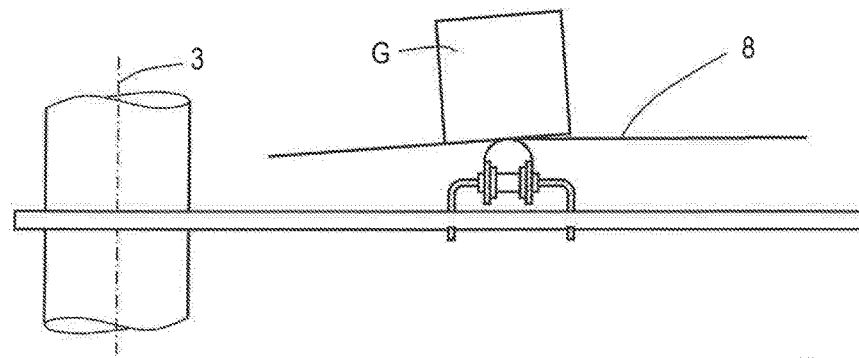
FIGS. 23-26 are cross-sectional views similar to FIGS. 15-18 of still another alternative embodiment.
Figure 24:
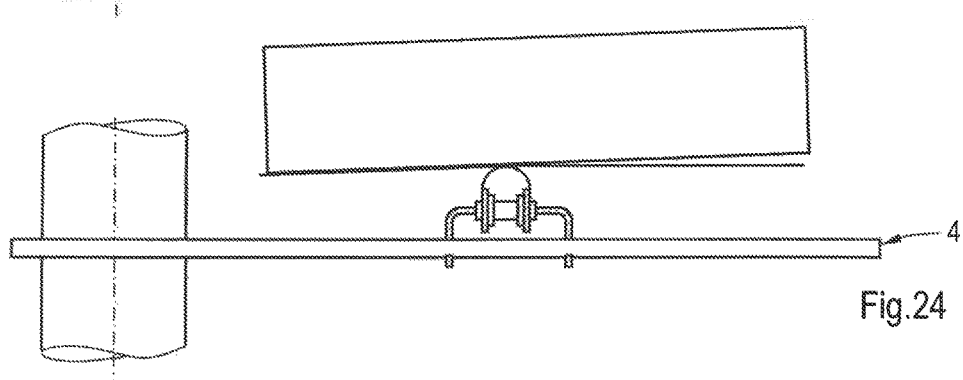
Figure 25:
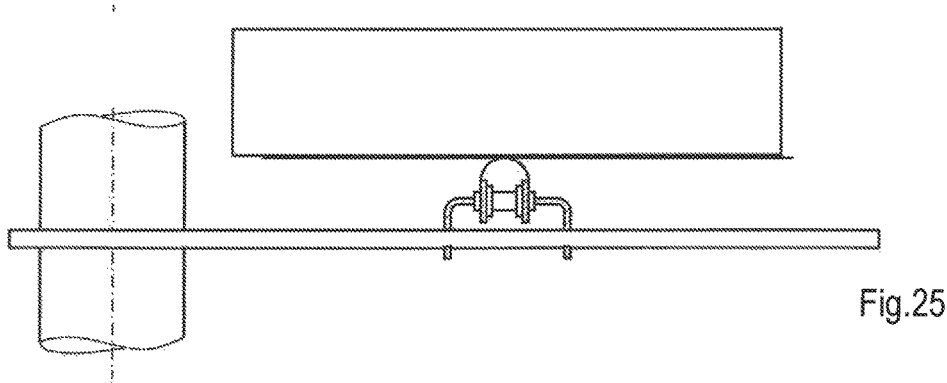
Figure 26:
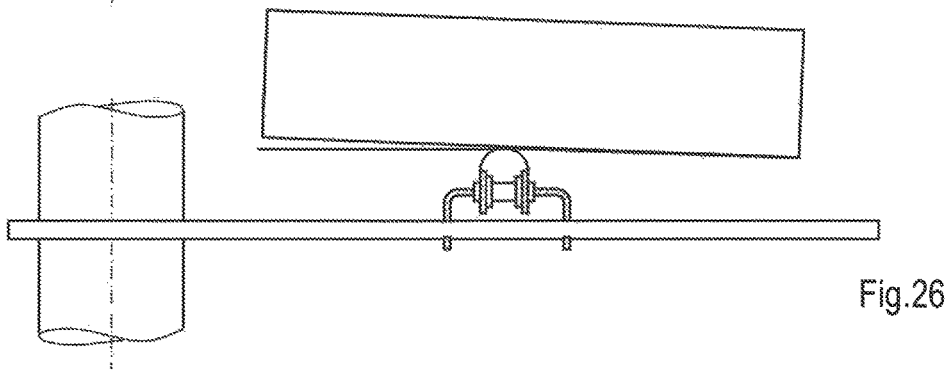

FIGS. 23-26 show still another alternative embodiment. In this case each of the slats has a flat upper side and the slats are bendable in the vertical direction in order to obtain a twistable supporting surface. The slats are only fixed to the chain at the helical centerline. In the cross-sections as shown in FIGS. 23-26 it can be seen that the slats take a position which corresponds to the bottom of the block-shaped product G. FIGS. 23, 24 and 26 show that the non-loaded parts of the slats do not rebound.

The invention is not limited to the embodiments described hereinbefore, which may be varied in different manners within the scope of the claims. The projection on a slat may have a different shape than spherical, for example a pyramid shape, or a semi-cylindrical shape having its longitudinal direction in the conveying direction. In the latter case a curved line contact will be approached.

The invention claimed is:

1. A conveyor, comprising a helical conveying path having an upright central axis, a frame and an endless conveying member configured to transport a product through the conveying path which conveying member is displaceable with respect to the frame, wherein in a central portion of the conveying path as seen in a radial direction from the central axis the conveying member is provided with an upwardly directed supporting surface for supporting the product, wherein the upwardly directed supporting surface is formed by upper sides of projections of the conveying member, wherein a width of the supporting surface in the radial direction from the central axis is smaller than 10% of a distance between the central axis and the supporting surface and in that at opposite sides of the supporting surface the conveying path is free from obstacles at a height level of the supporting surface, and wherein the conveyor is provided with a helical guide configured to guide the conveying member along said helical guide.

2. The conveyor according to claim 1, wherein the supporting surface is narrower than 10% of the width of the conveying path.

3. The conveyor according to claim 1, wherein the supporting surface is configured such, that a substantially rigid, flat bottom of the product being supported by the conveying member and being wider than the supporting surface, has at least three contact locations with the supporting surface, which contact locations lie on a curved line and at a distance from each other.

4. The conveyor according to claim 1, wherein the supporting surface is spherical, as seen in a plane in which the central axis lies.

5. The conveyor according to claim 1, wherein the conveyor is provided with a bearing surface for bearing the product which is tilting with respect to the supporting surface, and wherein the bearing surface is located at a distance from the supporting surface in the radial direction from the central axis.

6. The conveyor according to claim 5, wherein the bearing surface is directed upwardly and located below the supporting surface, as seen in a plane in which the central axis lies.

7. The conveyor according to claim 5, wherein the bearing surface is located at an inner bend of the conveying path and is directed outwardly with respect to the central axis.

8. The conveyor according to claim 7, wherein the bearing surface is located above the supporting surface, as seen in a plane in which the central axis lies.

9. The conveyor according to claim 5, wherein the bearing surface forms a part of the frame.

10. The conveyor according to claim 5, wherein the bearing surface is located at an outer bend of the conveying path and is directed to the central axis.

11. The conveyor according to claim 1, wherein the conveying member comprises a slat belt having a plurality of slats and wherein each of the slats is provided with a projection.

12. The conveyor according to claim 11, wherein the projections are spherical.

13. The conveyor according to claim 12, wherein the projections are located at a centerline of the slat belt.

14. The conveyor according to claim 5, wherein the bearing surface is located at an inner bend of the conveying path and is directed outwardly with respect to the central axis and a second bearing surface is located at an outer bend of the conveying path and is directed to the central axis.

15. A conveyor, comprising a helical conveying path having an upright central axis, a frame and an endless conveying member being a slat belt having a plurality of slats configured to transport a product through the conveying path which conveying member is displaceable with respect to the frame, wherein the conveying member is provided with an upwardly directed supporting surface configured to support the product, wherein the upwardly directed supporting surface is formed by upper sides of projections of the conveying member, and wherein the supporting surface is formed by slats and is twisted about a helical centerline of the slat belt.

16. The conveyor according to claim 15, wherein the slats are tiltable about the helical centerline of the slat belt in order to obtain a twistable supporting surface.

17. The conveyor according to claim 15, wherein the slats are bendable in a vertical direction with respect to the helical centerline in order to obtain a twistable supporting surface.

18. The conveyor according to claim 15, wherein each of the slats is provided with a central portion and lateral portions which are located in radial direction with respect to the central axis at opposite sides of the central portion, wherein the lateral portions are resiliently connected to the central portion.

* * * * *